No. 783,620.                                              Patented February 28, 1905.

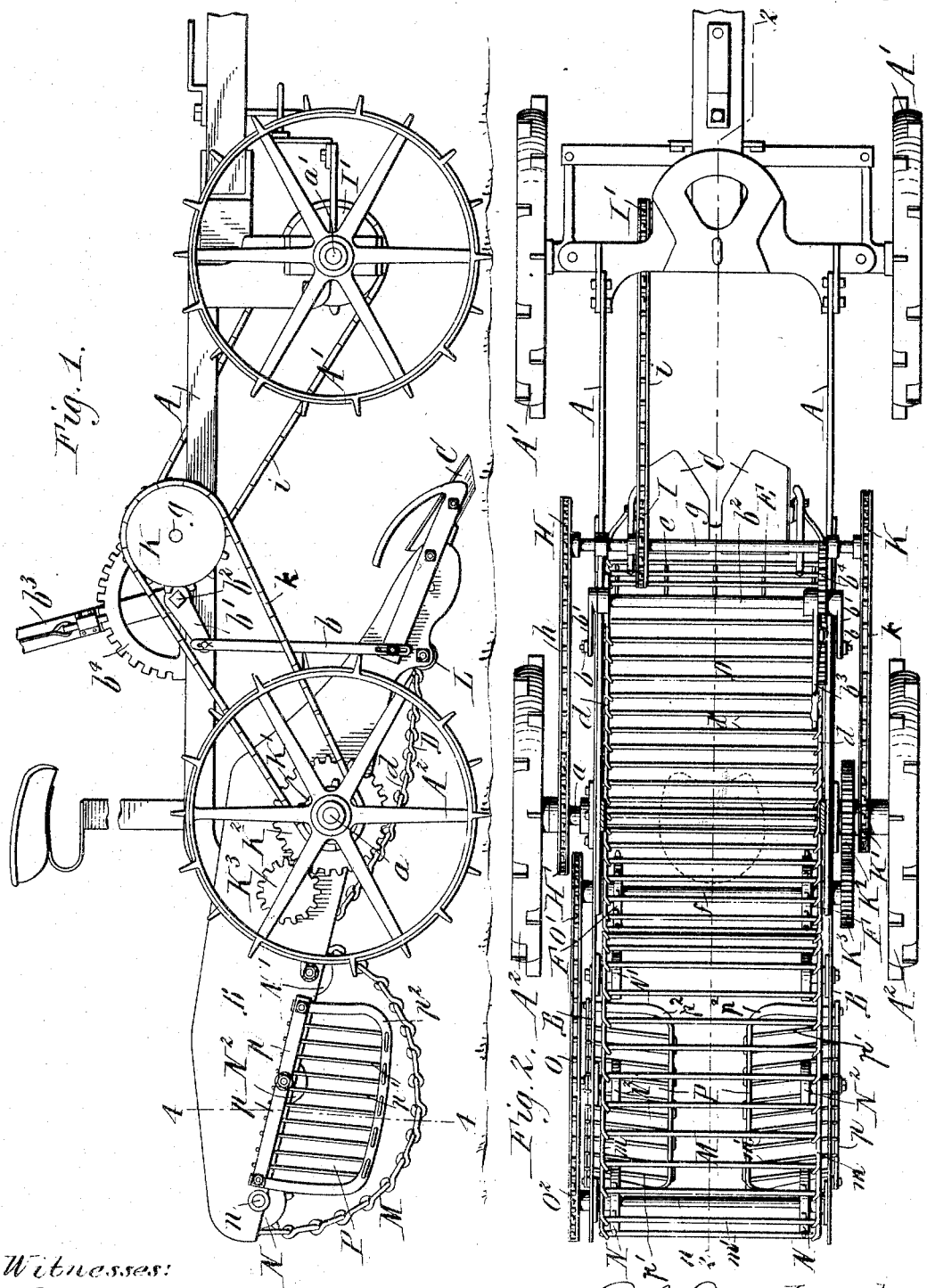

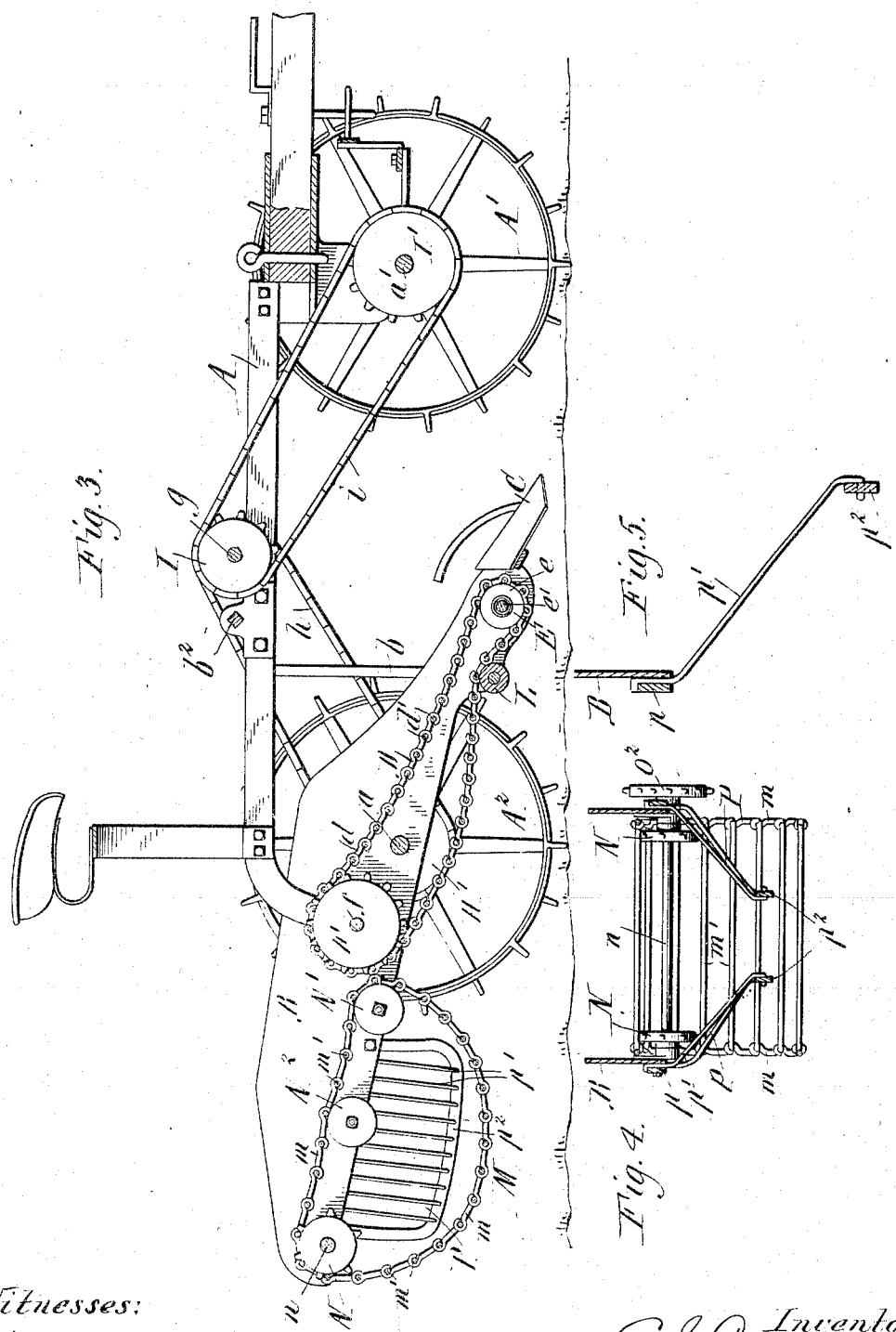

UNITED STATES PATENT OFFICE.

CHARLES J. CUMMINGS, OF TULLY, NEW YORK.

POTATO-DIGGER.

SPECIFICATION forming part of Letters Patent No. 783,620, dated February 28, 1905.

Application filed February 8, 1904. Serial No. 192,676.

*To all whom it may concern:*

Be it known that I, CHARLES J. CUMMINGS, a citizen of the United States, and a resident of Tully, in the county of Onondaga and State of New York, have invented a new and useful Improvement in Potato-Diggers, of which the following is a specification.

This invention relates to that class of potato-diggers which are provided in rear of the plow or scoop with one or more endless separators or elevators upon which the earth and potatoes pass from the plow or scoop and by which the earth is loosened and separated from the potatoes.

The invention has for its object to improve the separating mechanism with a view of effecting a more complete separation of the potatoes from the earth and dropping the potatoes upon the ground in such manner that the potatoes are not liable to be covered by the loose earth, but are exposed and can be readily picked up.

In the accompanying drawings, consisting of two sheets, Figure 1 is a side elevation of a potato-digger provided with my improvements. Fig. 2 is a top plan view thereof. Fig. 3 is a longitudinal sectional elevation in line 3 3, Fig. 2. Fig. 4 is a vertical transverse section through the final separator in line 4 4, Fig. 1. Fig. 5 is a detached vertical cross-section through one of the concentrating-racks on an enlarged scale.

Like letters of reference refer to like parts in the several figures.

A represents the longitudinal side pieces of the main frame, which latter may be of any suitable construction and is preferably supported on four driving-wheels—front wheels A' and rear wheels $A^2$—in order to provide ample traction-power, although other means for driving the separators may be employed, if desired. A similar mechanism for driving the movable parts from four driving-wheels is described and shown in my Patent No. 735,216, August 4, 1903, to which reference is made for a more complete description thereof.

B represents the adjustable frame, in which the plows and the separator mechanism are mounted and which is pivotally supported on the rear axle $a$. This frame is capable of vertical adjustment by any suitable means, so that the plows can be raised and lowered to regulate the depth of cut or can be carried above the ground. The mechanism shown for that purpose consists of upright rods $b$, attached at their lower ends to the front portion of the plow-frame B and at their upper ends to rock-arms $b'$ on a transverse rock-shaft $b^2$, which is provided with an adjusting-lever $b^3$, held in position on a locking-segment $b^4$.

C represents the plows or scoops secured side by side in the front portion of the plow-frame.

D represents the primary separator, which is mounted in the plow-frame in rear of the plows and ascends rearwardly therefrom. This separator consists, as usual, of two endless chains $d$, arranged on the inner sides of the longitudinal members of the plow-frame, and cross-bars $d'$, which are preferably formed in one piece with the adjacent chain-links. These cross-bars and links form a skeleton apron which travels with its upper portion rearwardly and upwardly from the plows. The cross-bars are so spaced that they will prevent potatoes of average size from dropping through. This primary separator runs at the front directly in rear of the plows around a roller E, composed of disks $e$, secured to a transverse shaft $e'$, and at the rear around two driving sprocket-wheels F, mounted on a transverse shaft $f$. The separator mechanism is preferably driven from a main driving-shaft $g$, which is arranged transversely on the main frame A above the front portion of the plow-frame and connected with the rear axle $a$ by a drive-chain $h$ and sprocket-wheels H H' and with the front axle $a'$ by a drive-chain $i$ and sprocket-wheels I I'. The driving sprocket-wheels F of the primary separator are driven from the main shaft $g$ on the right-hand side of the machine, as follows: $h$ represents a drive-chain which runs around a sprocket-wheel K on the main shaft $g$ and around a sprocket-wheel K', mounted loosely on the rear axle $a$. The sprocket-wheel K' is secured to a gear-wheel $K^2$, which meshes with a gear-wheel $K^3$ on the shaft $f$, to which the sprocket-wheels F are secured.

L represents a cleaning-roller which is journaled loosely in the plow-frame underneath the lower or return reach of the primary separator in such a position that the cross-bars of this separator will strike against this roller in moving forwardly to the front roller E and will thereby be freed from adhering earth. This roller is made of rigid material—such as wood or iron, or both—so that the impact of the bars against the roller will effect the desired cleaning of the separator. The roller is rotated by the separator-bars moving over it and is not required to be rotated by special driving mechanism.

M represents the secondary separator, which is arranged in rear of the primary separator and receives therefrom the potatoes, vines, and other material which have not passed through the primary separator. This separator also consists of an endless skeleton apron composed of chain-links $m$ and cross-bars $m'$. The latter are spaced so far apart that the potatoes will drop through this separator, while vines and other large material are carried on this separator and discharged over the rear end thereof. This separator is driven at the rear by sprocket-wheels N, secured to a transverse shaft $n$, and runs around front rollers N' and intermediate rollers N². The shaft $n$ is driven on the left-hand side of the machine from the sprocket-shaft $f$ of the primary separator by a drive-chain O and sprocket-wheels O' O². This final separating-apron is preferably hung rather loosely upon the sprocket-wheels N and rollers N' N², so that the lower or return reach of the apron is rather slack. Between the upper and lower reaches of this separator there are arranged two longitudinal inwardly-converging racks P, which are secured with their upper and outer ends to the side pieces of the plow-frame and are separated at their inner and lower ends by a comparatively narrow longitudinal space. Each of these racks is preferably composed of an upper longitudinal bar $p$, which is secured to the outer side of the plow-frame, downwardly and rearwardly inclined rods or bars $p'$, which are so spaced that they will not allow the potatoes to pass through, and a lower longitudinal connecting-bar $p^2$.

The operation of the machine is as follows: The earth and potatoes elevated by the plows are further elevated by the primary separator, and a considerable portion of the earth is detached from the potatoes and dropped through the primary separator to the ground, while the potatoes, vines, and other large matter are delivered to the final separator. The potatoes drop here first through the upper reach of the separator, and those potatoes which fall upon the concentrating-racks are deflected inwardly. The potatoes pass downwardly through the narrow space between the concentrating-racks to the lower reach of the final separator and drop from the latter to the ground in a row of comparatively small width, which renders it easy to pick up the potatoes. The earth which is separated from the potatoes on the upper reach of the final separator drops readily through the bars of the separator to the ground, while the potatoes are retarded more or less in dropping through the upper reach of the separator, the concentrating-racks, and the lower reach of the separator. The potatoes therefore reach the ground last and are not liable to be covered by loose earth, whereby the operation of collecting the potatoes is greatly facilitated.

Instead of two concentrating-racks arranged as above described a single inclined rack may be employed, as represented in Fig. 5.

I claim as my invention—

1. In a potato-digger, the combination of an endless traveling separating-apron which allows the potatoes to drop through its upper and lower reaches, and an open stationary rack which is arranged between the upper and lower reaches of said apron and which allows the earth to drop through while it retards the potatoes and deflects the same laterally, substantially as set forth.

2. In a potato-digger, the combination of an endless traveling separating-apron which allows the potatoes to drop through its upper and lower reaches, and a stationary rack which is arranged between the upper and lower reaches of the apron and directs the potatoes to the middle of the lower reach, substantially as set forth.

3. In a potato-digger, the combination of an endless separator and two downwardly-converging deflecting-racks arranged between the upper and lower reaches of the separator, substantially as set forth.

4. In a potato-digger, the combination of a frame provided at its front end with a plow, a longitudinal endless separating-apron which allows the potatoes to drop through its upper and lower reaches, and a stationary deflecting-rack secured to said frame and extending between the upper and lower reaches of said apron, said rack directing the potatoes to the middle of the lower reach, substantially as set forth.

5. In a potato-digger, the combination of a frame provided at its front end with a plow, a primary endless separator arranged in said frame in rear of said plow, a final endless separator arranged in said frame in rear of said primary separator, and downwardly-converging deflecting-racks secured to said frame and extending between the upper and lower reaches of said final separator, substantially as set forth.

Witness my hand this 14th day of January, 1904.

CHARLES J. CUMMINGS.

Witnesses:
F. McCULLOCK,
F. P. ARNOLD.